United States Patent [19]
Friedrich et al.

[11] Patent Number: 5,873,342
[45] Date of Patent: Feb. 23, 1999

[54] DRIVE UNIT WITH INTERNAL COMBUSTION ENGINE AND HYDRODYNAMIC RETARDER

[75] Inventors: Jurgen Friedrich; Klaus Vogelsang, both of Crailsheim; Peter Heilinger, Satteldorf; Hans Gebhardt, Langenzenn; Heribert Moller, Sachsen, all of Germany

[73] Assignee: Voith Turbo GmbH, Heidenheim, Germany

[21] Appl. No.: 967,725

[22] Filed: Nov. 10, 1997

Related U.S. Application Data

[63] Continuation of Ser. No. 589,272, Jan. 22, 1996, abandoned.

[30] Foreign Application Priority Data

Jan. 23, 1995 [DE] Germany .............................. 19501853

[51] Int. Cl.⁶ ..................................................... F02F 7/00
[52] U.S. Cl. ....................................... 123/195 A; 188/296
[58] Field of Search ........................ 188/296; 123/41.44, 123/320, 195 A

[56] References Cited

U.S. PATENT DOCUMENTS

| | | | |
|---|---|---|---|
| 1,915,547 | 6/1933 | North et al. | |
| 2,864,473 | 12/1958 | Christenson | 192/4 |
| 3,124,218 | 3/1964 | Montgomery | 188/90 |
| 3,335,823 | 8/1957 | Nagel | 199/90 |
| 3,490,567 | 1/1970 | Clark et al. | 192/3 |
| 3,631,949 | 1/1972 | Mazalov | 192/4 B |
| 3,650,358 | 3/1972 | Bessiere | 188/296 |
| 3,720,372 | 3/1973 | Jacobs | 237/12.3 |
| 3,794,001 | 2/1974 | Birch et al. | 123/41.05 |
| 3,952,508 | 4/1976 | Bopp | 60/330 |
| 4,405,038 | 9/1983 | Ternehall | 192/4 |
| 4,922,872 | 5/1990 | Nogami et al. | 123/319 |
| 5,657,723 | 8/1997 | Edelmann et al. | 123/41.31 |

FOREIGN PATENT DOCUMENTS

| | | |
|---|---|---|
| 1 946 167 | 11/1975 | Germany . |
| 1946167 | 11/1975 | Germany . |
| 17 80 730 | 5/1978 | Germany . |
| 33 01 560 C1 | 4/1984 | Germany . |
| 3301560 | 5/1984 | Germany . |
| 37 13 580 C1 | 11/1988 | Germany . |
| 37 13580 C1 | 11/1988 | Germany . |
| 3713580 | 11/1988 | Germany . |
| 2 063 420 | 11/1979 | United Kingdom . |

Primary Examiner—Noah P. Kamen
Attorney, Agent, or Firm—Baker & Daniels

[57] ABSTRACT

A drive unit for a motor vehicle including an internal combustion engine, a transmission and a hydrodynamic retarder. The retarder includes both a rotor and a stator wherein the rotor is mounted on the engine crankshaft or crankshaft journal and the stator is disposed between the crankcase and rotor.

7 Claims, 8 Drawing Sheets

FIG_4

005,873,342

DRIVE UNIT WITH INTERNAL COMBUSTION ENGINE AND HYDRODYNAMIC RETARDER

This is a continuation of application, Ser. No. 08/589,272, filed Jan. 22, 1996, abandoned.

BACKGROUND OF THE INVENTION

The invention relates to a drive unit, specifically for a motor vehicle, including an internal combustion engine, a transmission and a hydrodynamic retarder including a rotor and stator.

Such a drive unit is known from DE 37 13 580 C1.

Retarders are employed primarily in heavy vehicles to absorb the kinetic braking energy accruing notably in braking actions at high speed of travel (adaptation braking) and to convert it to heat. But retarders are suited well also for required sustained braking outputs, for instance at a constant speed of 30 km/h on an incline of 7%. Oil serves normally as the operating fluid. The heat transferred in the retarder to the operating fluid must be delivered, by means of a heat exchanger, to the coolant or ambient air.

The retarder described in U.S. Pat. No. 3,720,372 is integrated in the engine of the drive, permanently joined to the crankshaft and constantly flooded by the coolant of the cooling system. The rotor of the retarder serves as circulating pump, instead of utilizing a separate coolant pump. The purpose of this system is to cause heating of the coolant by means of the retarder for heating the passenger compartment. The same purpose serves also a control system arranged on the retarder, which controls merely the distribution of the coolant, depending on its temperature in a bypass line through the radiator.

Also known, from DE-PS 33 01 560, is a retarder which by way of a clutch is connected to the crankshaft of the drive engine and to the driven wheels of the vehicle. But the purpose of the retarder is not absorbing and converting high kinetic braking energy of the vehicle to heat. The retarder is operated exclusively as a heater, with the heating output meant to be controlled with a view to an available operating energy input. The coolant of the engine is likewise the operating fluid of the retarder.

A retarder described in DE-AS 1 946 167 (U.S. Pat. No. 3,650,358) is powered by the crankshaft of an internal combustion engine whose coolant serves also as operating fluid for the retarder. The advantage of this mode of operation is that the accruing heat develops directly in the coolant passed to the radiator and that a heat exchanger between two fluids is not needed. The rotor is mounted on an antifriction bearing and the seal between frame and rotor shaft is established by two lip seals.

The desire with drive units of this type is to keep the axial overall dimension and the weight as low as possible, especially when the drive unit is intended for a motor vehicle. With the drive units known heretofore, this was not achieved to a desirable degree.

SUMMARY OF THE INVENTION

The objective underlying the invention is to fashion a drive unit in such a way that the axial overall dimension and the weight will be less than with prior drive units.

In accordance with the present invention, the rotor of the hydrodynamic retarder is mounted either on the engine shaft or on a crankshaft journal coaxial therewith, and the stator is disposed, in the axial direction, between the crankcase and rotor. The following advantages result from a drive unit in accordance with the present invention:

The cantilevered mounting of the retarder rotor makes unnecessary a separate bearing, or in some cases two separate bearings, for the rotor of the retarder. This reduces the axial length.

Also with a given internal combustion engine the space between the fan and crankcase, in front of the engine, can be utilized for the retarder, without requiring an appreciable modification of the crankcase and fan.

BRIEF DESCRIPTION OF THE DRAWINGS

The invention is more fully explained with the aid of the drawings, which in detail show the following.

DETAILED DESCRIPTION

Figure 1:
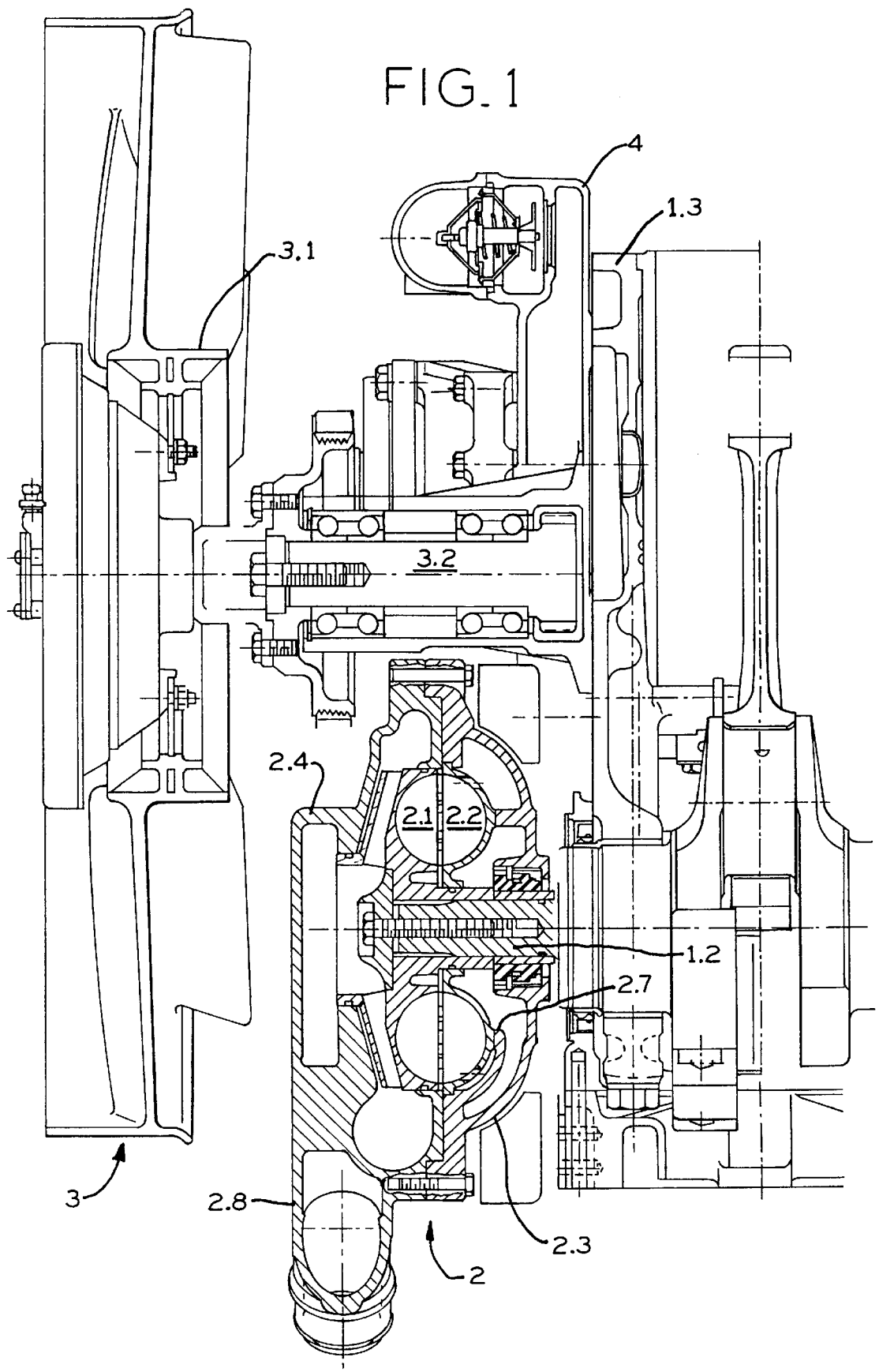
FIG. 1, a drive unit in side elevation and partly in axial section along line A—A of FIG. 2.

FIG. 1 depicts only a few parts of the engine, among others, the crankshaft 1, connecting rod 1.1, a crankshaft journal 1.2 screwed to the end face of the crankshaft 1, and a crankcase 1.3. Located to the left of crankcase 1.3, in FIG. 1, are a retarder 2 and fan 3.

The retarder 2 includes a rotor impeller wheel 2.1 and a stator impeller wheel 2.2. Rotor impeller wheel 2.1 is mounted in a cantilevered fashion on the crankshaft journal 1.2. The retarder includes a housing which is structured of a bell 2.3 surrounding the stator impeller wheel 2.2 and a cover body 2.4. The crankshaft journal 1.2 also supports a damper device 2.5 joined to the crankshaft journal 1.2 in rotationally fixed fashion.

Fan 3 is rotated by the crankshaft 1 of the engine by way of a gearset, which is illustrated only in part. As can be seen, fan shaft 3.2 extends parallel to crankshaft journal 1.2.

Figure 2:
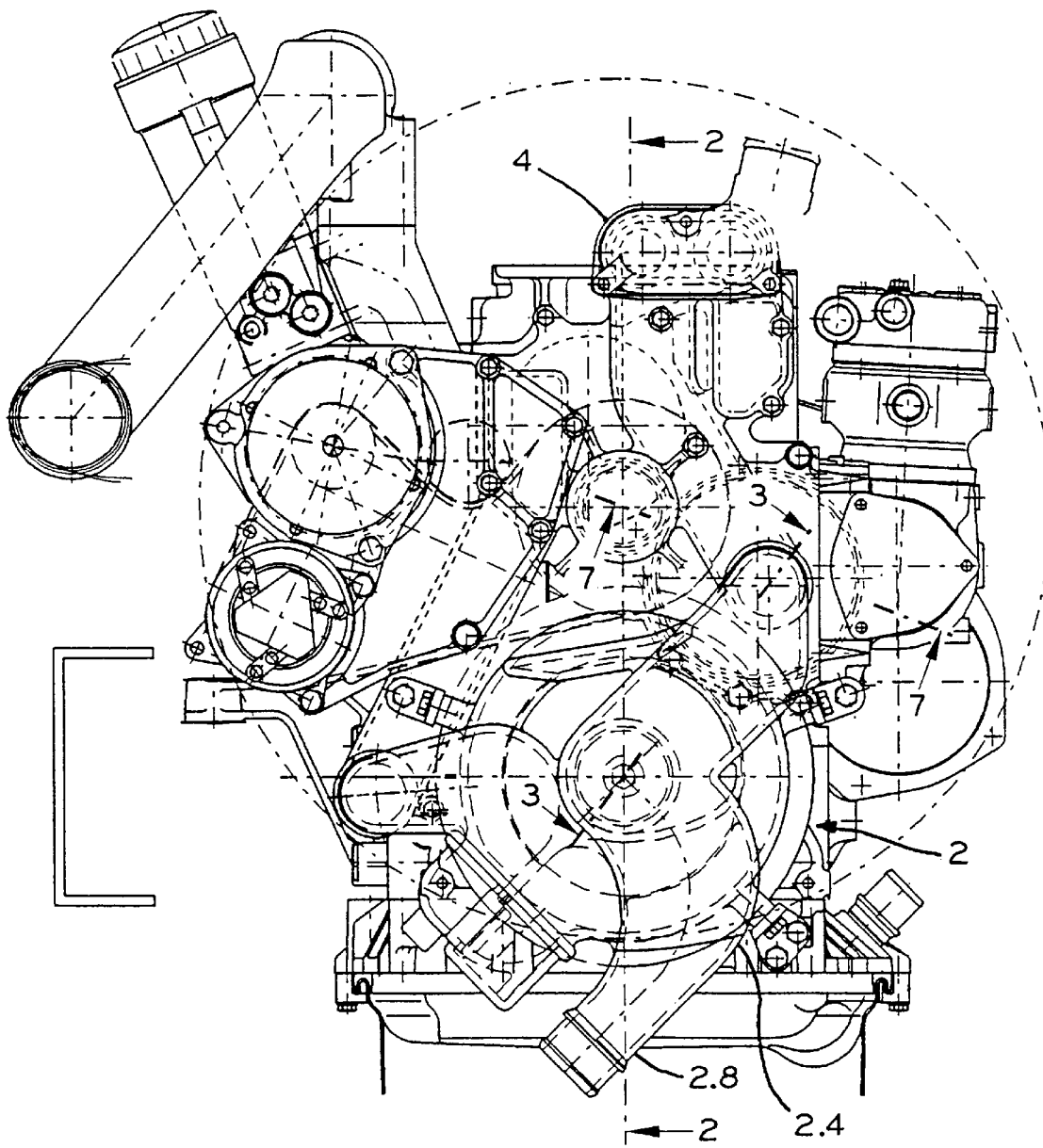
FIG. 2, the same drive unit in plan view toward the engine shaft, with the fan wheel removed; the fly circle of the fan wheel indicated by dash-dot line.

The arrangement is such that retarder 2 occupies virtually the entire space bounded by the end face of crankcase 1.3 facing retarder 2 or the gearset driving fan 3, additionally by fan shaft 3.2 and, lastly, the rear edge of fan wheel 3.1. Retarder 2 with cover body 2.4 is contained, in plan view relative to FIG. 2, within the fly circle of the fan wheel 3.1. Thus, the space is utilized optimally.

A very decisive advantage of this arrangement of retarder 2 in the space between crankcase 1.3, fan shaft 3.2 and fan wheel 3.1 is that the air flow generated by fan wheel 3.1, due to the spatial proximity between fan wheel 3.1 and retarder 2, removes from the outside surfaces of the latter heat generated by braking action. Thus, the requirements of a heat exchanger coordinated with the retarder are reduced substantially.

With retarder 2 located directly in front of the engine (cold side of engine cooling), the mass of water contained between the retarder inlet and the radiator, along with the mass of the engine oil and, prorated, with the metal mass of the cooling system including the engine, can be utilized for capacitive energy absorption. The heat capacity available to the retarder is increased thereby and the braking output can briefly be greater than the continuous heat dissipation of the vehicle radiator.

The compact arrangement according to the invention reduces the piping to a minimal length. This also minimizes the problems which in conventional drive units derive from relatively long piping paths.

The cover body 2.4 serves several functions:

It forms part of the retarder housing by enclosing the rotor impeller wheel 2.1.

Figure 3:
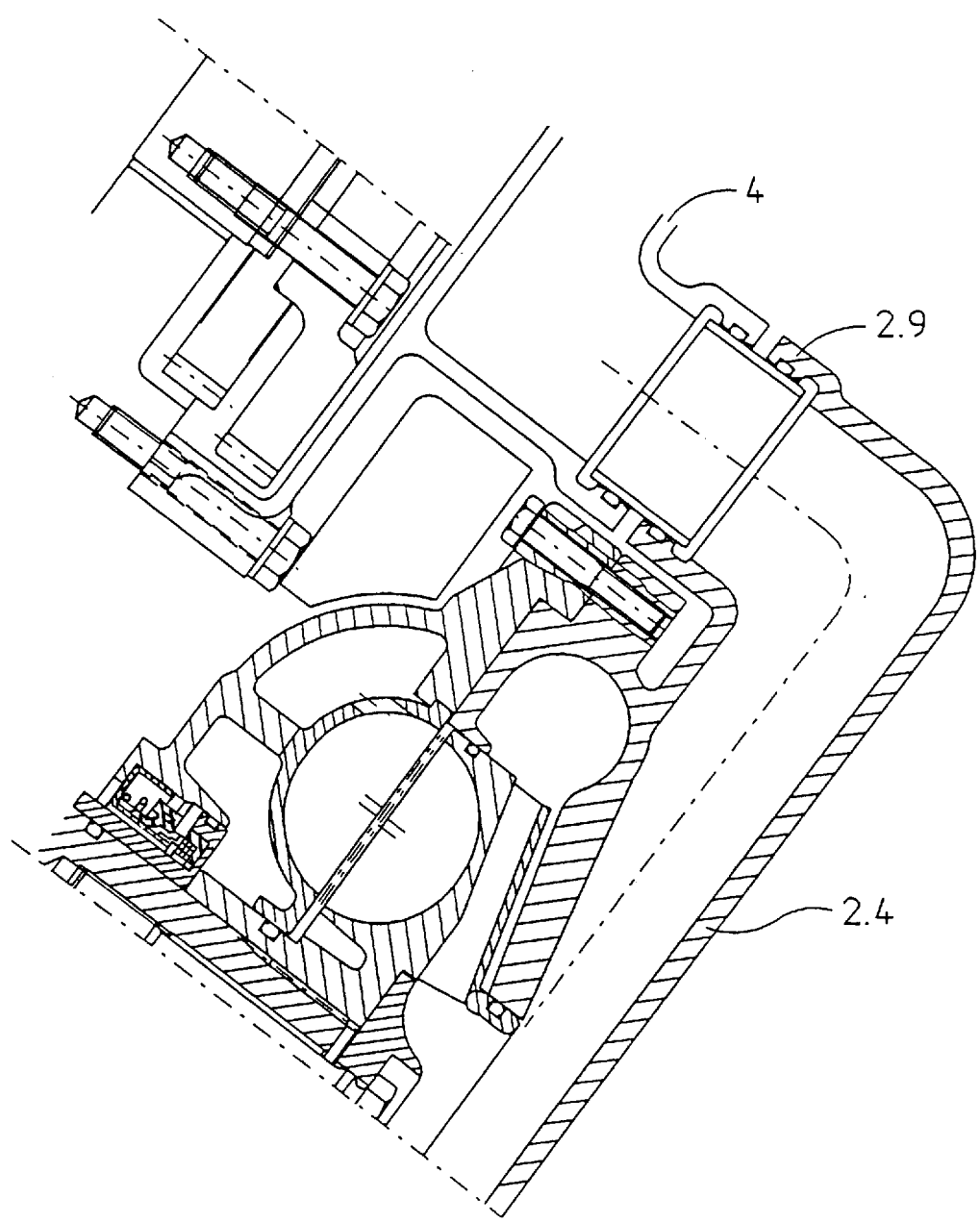
FIG. 3, an enlarged sectional view along line B—B of FIG. 2.
Figure 4:
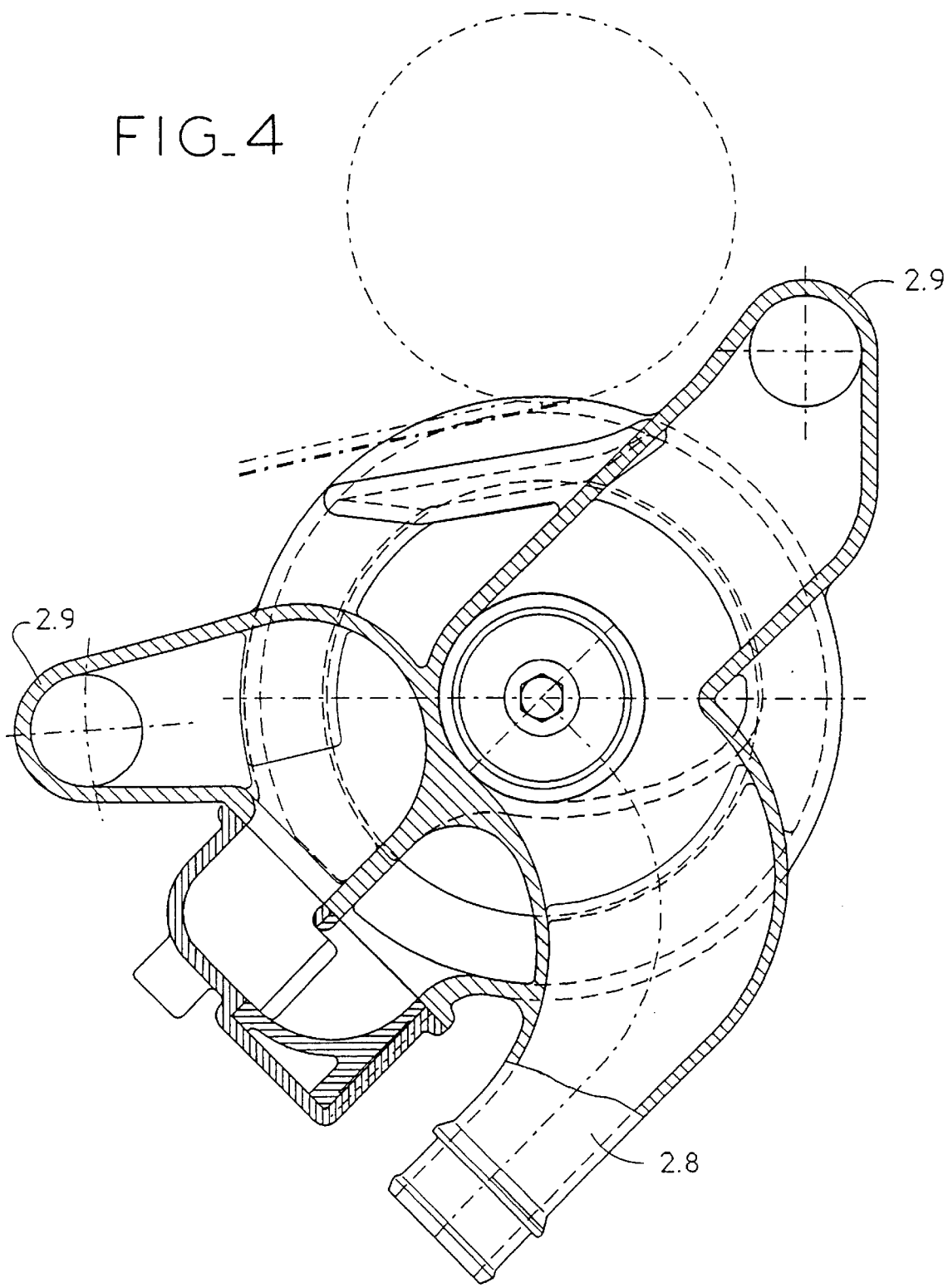
FIG. 4, the retarder 4 in a plan view in the direction of the engine shaft.

As a hollow body it forms a collecting chamber with three ports, namely two inlets and one outlet for the medium, which due to the configuration of this drive unit is simultaneously a cooling medium and an operating medium (so-called water pump retarder); drawing cooling water from the vehicle radiator, one of the three ports, namely 2.8, which draws cooling water from the vehicle radiator, is illustrated in FIG. 1, and the two other ports 2.9 are shown in FIGS. 3 and 4.

The cover body 2.4 bears on the crankcase 1.3, either directly or via the bell 2.3, or otherwise on the fixed surrounding structure, thus forming a torque support.

The cover body 2.4 is joined to the stator housing or bell 2.3. It thus supports stator housing 2.3 or, vice versa, the stator housing 2.3 supports the cover body 2.4. Additionally, it serves as a centering element for stator housing 2.3, or the stator housing for the cover body, thus being able to center at the same time the mechanical seal between stator housing 2.3 and crankshaft journal 1.2.

The cover body 2.4 supports the stator impeller wheel 2.2, and is joined to it by a slip-on joint and rests axially on the joining surfaces 2.7.

The advantages resulting from this arrangement are manifold. Primarily the design and arrangement of the cover body contributes to the compactness of the design. The entire drive unit is service-friendly, since removal of the fan wheel 3.1 and the cover body 2.4 provides free access to all major parts.

While in the illustrated embodiment no separate crankshaft journal 1.2 is used, this is possible, of course. In the example, the crankshaft journal 1.2 is fashioned to the crankshaft 1, the crankshaft journal 1.2 and crankshaft 1 forming a single component.

FIG. 3 depicts once more the major components, as far as these relate to the structure of the retarder. Specifically, it illustrates that cover body 2.4 connects to the relevant piping ports in slip-on fashion. As follows from the above, the rotor 2.1 of the retarder 2 is preferably mounted in a cantilevered fashion; it is thus supported by the crankshaft bearing.

There is provided in a particularly skillful manner an intermediate body 4, which is located between crankcase 1.3 and fan 3, mounted on crankcase 1.3 and borders directly on cover body 2.4. Intermediate body 4 supports a plurality of elements, such as a complete fan assembly 3 including its shaft 3.2 and impeller wheel 3.1. Additionally, it centers the housings 2.3 and 2.4 of the retarder 2 and it can support additional units, for instance, thermostats.

Figure 5:
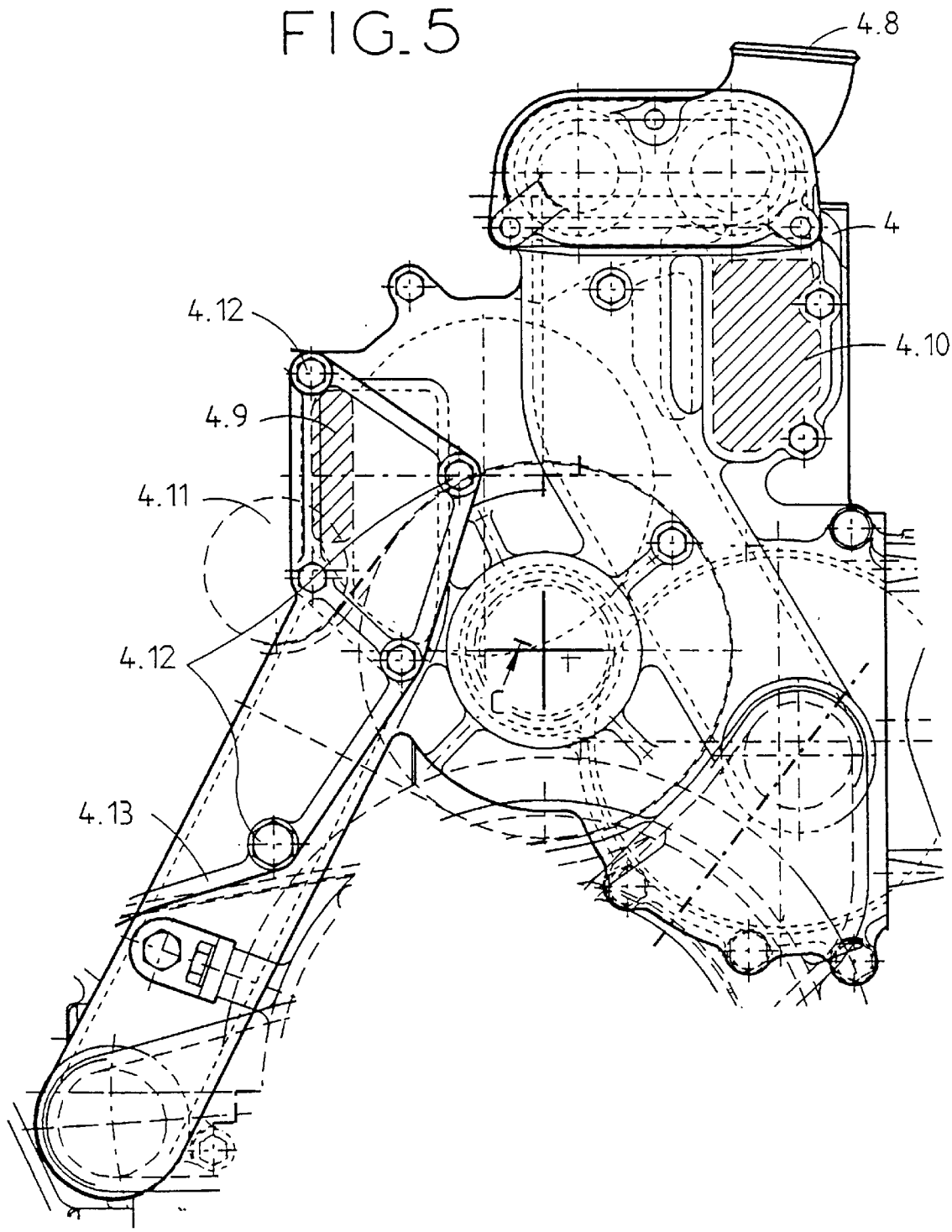
FIG. 5, in a view analogous to FIG. 2, an intermediate body between crankcase and retarder.

The silhouette of intermediate body 4 can be seen in FIG. 5—indicated there by heavy lines. Visible, in detail, are the inlet port 4.9 for the coolant to the engine and the outlet port 4.10 from the crankcase. Further visible is an idler pulley 4.11 for the V-belt of the accessory machines and attachment points 4.12 for a console 4.13 supporting auxiliary units. Located at the upper right in FIG. 5 is an outlet port 4.8 for coolant flowing to the radiator.

Figure 6:
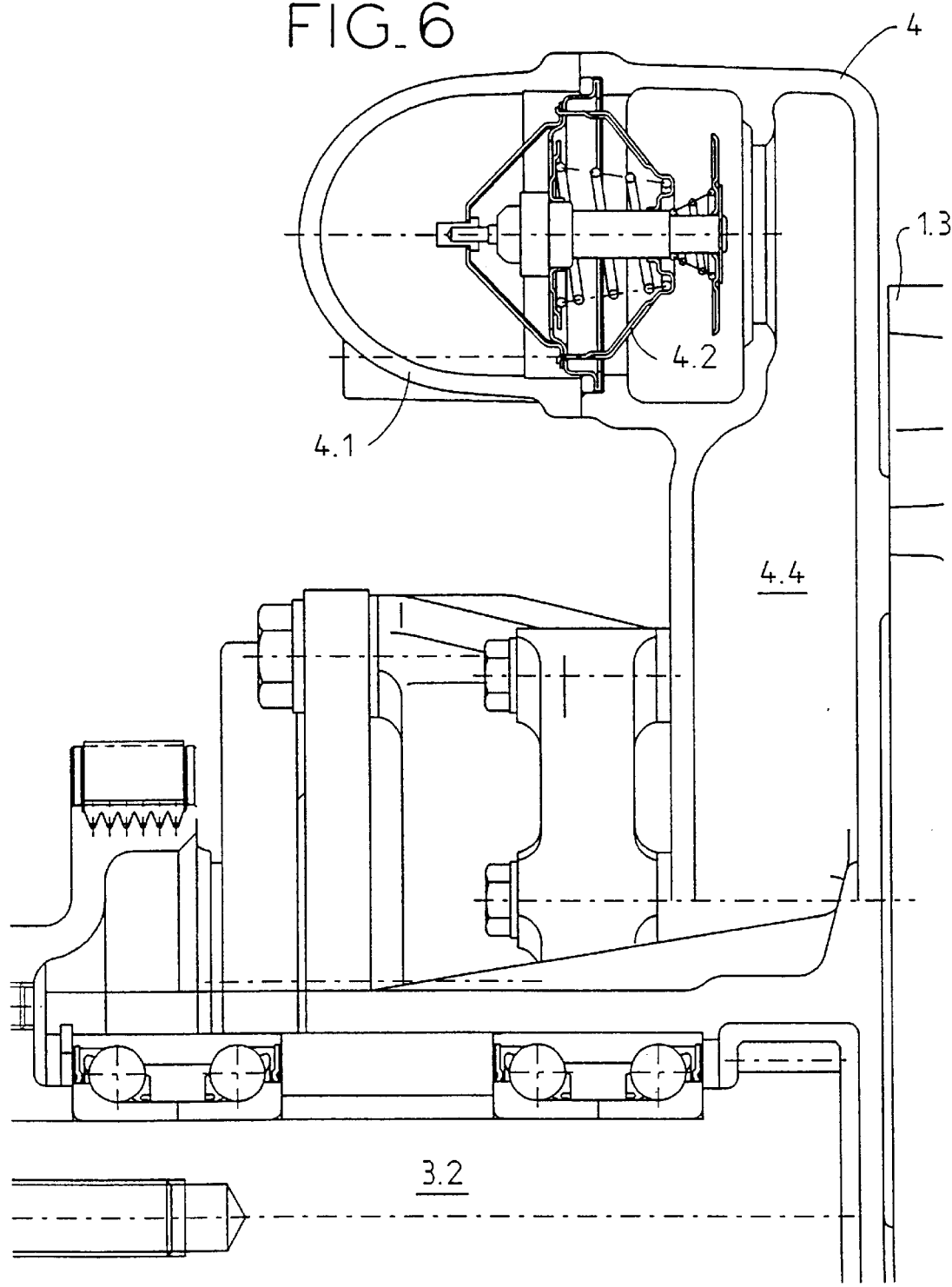
FIG. 6, an enlarged section of FIG. 1.

FIG. 6 shows the environs in the area of the fan shaft 3.2. Visible, in detail, are again the intermediate body 4, crankcase 1.3, a thermostat housing 4.1 as well as one of the thermostats 4.2, and a duct 4.4 as a short-circuit connection for fluid to the retarder 2.

Figure 7:
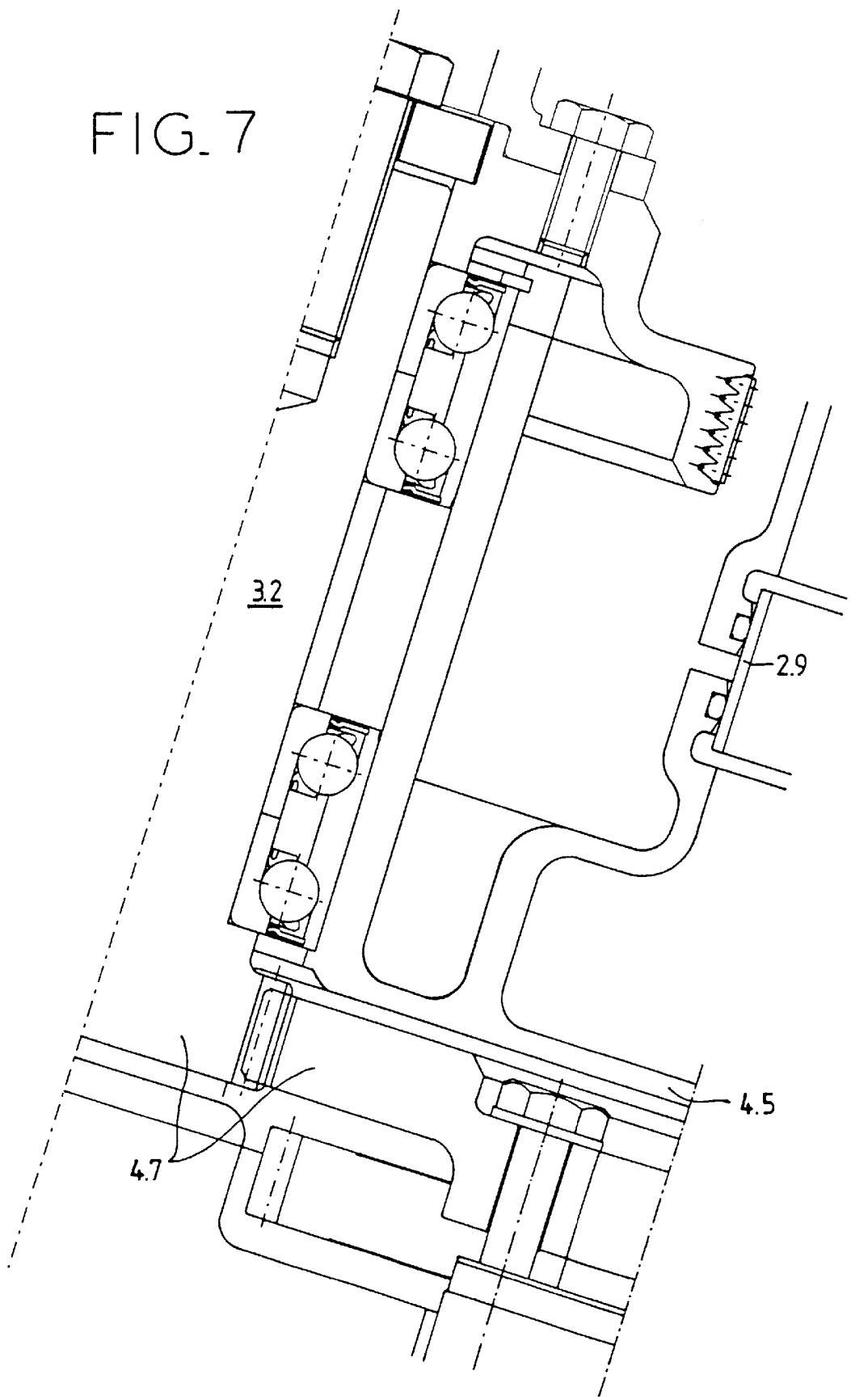
FIG. 7, an enlarged section of FIG. 2 along line C—C.

FIG. 7 shows among others a housing part 4.5 as a gear closure, along with the gears 4.7 for driving the fan 3, fan shaft 3.2, and shows as well the slip-on joint 2.9.

Figure 8:
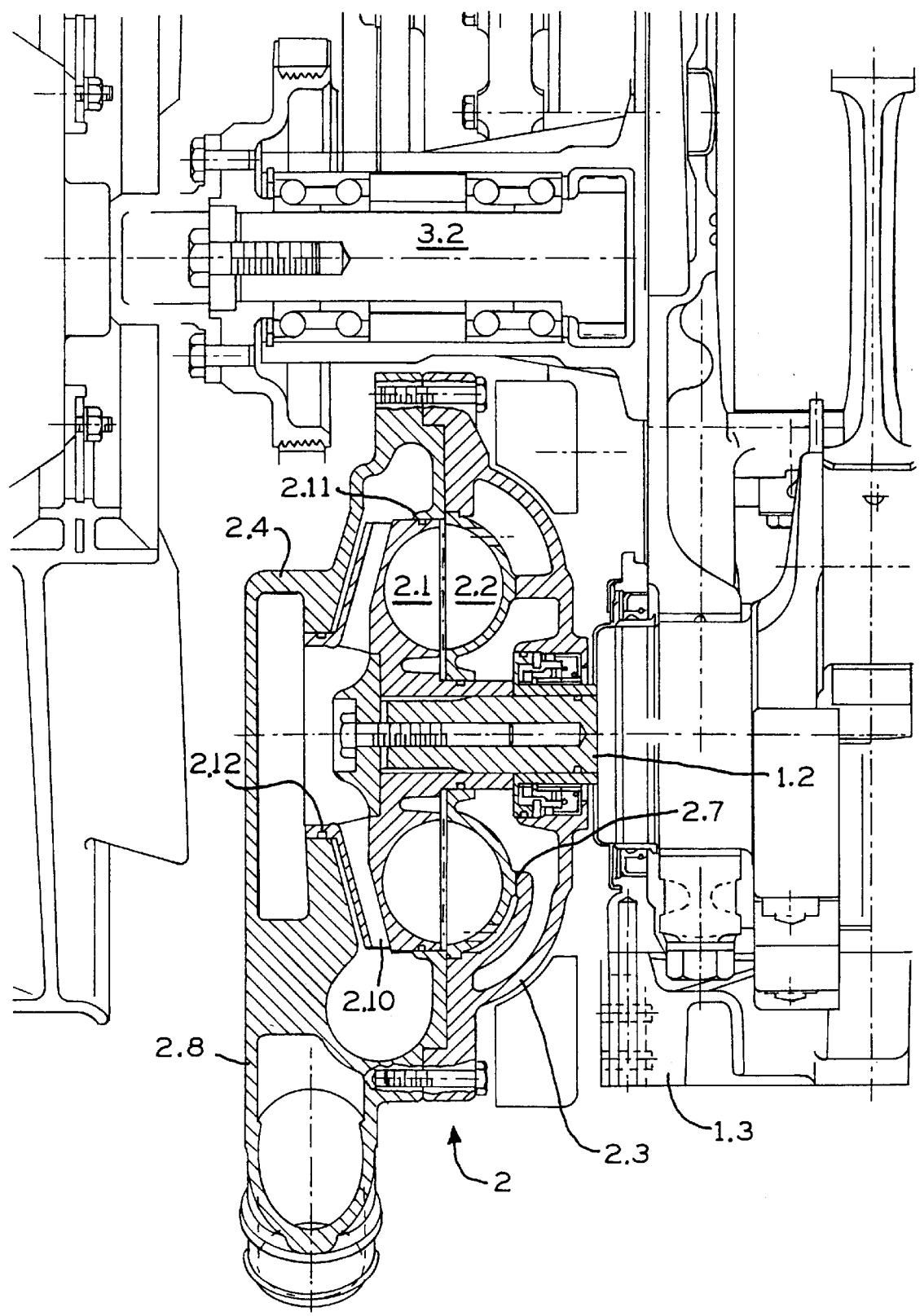
FIG. 8, an enlarged section of a portion of FIG. 1.

FIG. 8 depicts the retarder 2 in a more detailed fashion. As can be seen, the stator impeller wheel 2.2 is contained between crankcase 1.3 and rotor impeller wheel 2.1. Expressed differently, stator impeller wheel 2.2 is in relation to the engine near, while the rotor impeller wheel 2.1 is away. The cover body 2.4 is firmly screwed to bell 2.3.

The rotor impeller wheel 2.1 features on its back, near the cover body 2.4, pump blades 2.10. Hence, the rotor impeller wheel 2.1 exercises not only its function as rotor of the retarder 2, but at the same time also that of a pump. Naturally, the necessary packings are provided between the components rotating relative to one another, for example, packings 2.11 and 2.12 between rotor impeller wheel 2.1 and cover body 2.4.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

We claim:

1. A drive unit for a motor vehicle, comprising:

an internal combustion engine including a crankcase, a crankshaft having a crankshaft journal, and a crankshaft bearing providing support for said crankshaft and said crankshaft journal, said engine having a cooling circuit with a coolant circulated therein; and a hydrodynamic retarder including a rotor mounted on one of said crankshaft and crankshaft journal, and a stator disposed axially between the engine crankcase and said rotor, said rotor being mounted on an extending portion of said one of said crankshaft and said crankshaft journal, said extending portion being cantileveredly supported by said crankshaft bearing whereby said hydrodynamic retarder does not include a bearing for supporting said extending portion, said retarder in fluid communication with said cooling circuit whereby said coolant is a working medium of said retarder.

2. A drive unit according to claim 1, wherein said stator is rotationally fixed relative to said crankcase and said crankcase forms a torque support for said stator.

3. A drive unit according to claim 1 wherein said rotor includes pump blades on a back side of said rotor for circulating a coolant throughout an engine cooling circuit.

4. A drive unit according to claim 3 wherein said coolant is both a working medium of said retarder and a coolant of said cooling circuit.

5. A drive unit for a motor vehicle, comprising:

an internal combustion engine including a crankcase, a crankshaft and a crankshaft journal; and a hydrodynamic retarder including a rotor mounted on one of said crankshaft and crankshaft journal, and a stator disposed axially between the engine crankcase and said rotor, said stator being rotationally fixed relative to said crankcase, said rotor being mounted on an extending portion of said one of said crankshaft and said crankshaft journal, said extending portion being cantileveredly supported by said crankshaft bearing, said hydrodynamic retarder including a stator housing enclosing said stator, said stator housing including a bracket that is substantially perpendicular to the axis of said crankshaft, said bracket being fixed on said crankcase to radially position said stator relative to said crankcase and form a torque support for said stator.

6. A drive unit for a motor vehicle comprising:

an internal combustion engine including a crankcase and a crankshaft having a crankshaft journal; and a hydrodynamic retarder including a rotor mounted on one of said crankshaft and said crankshaft journal, and a stator disposed axially between the engine crankcase and said rotor, said retarder including a stator housing enclosing said stator, said stator housing including a bracket that is substantially perpendicular to the axis of said crankshaft, said bracket being fixed on said crankcase to radially position said stator relative to said crankcase and form a torque support for said stator.

7. A drive unit for a motor vehicle comprising:

an internal combustion engine including a crankcase and a crankshaft having a crankshaft journal; and a hydrodynamic retarder including a rotor mounted on one of said crankshaft and said crankshaft journal, and a stator disposed axially between the engine crankcase and said rotor, wherein said retarder includes a rotor shaft that extends from said retarder in a direction away from said crankcase, said rotor shaft carrying a v-belt pulley for servo-drives.

\* \* \* \* \*